(12) United States Patent
Katayama

(10) Patent No.: US 10,125,709 B2
(45) Date of Patent: Nov. 13, 2018

(54) ABNORMALITY DIAGNOSTIC DEVICE FOR INTERNAL COMBUSTION ENGINE AND ABNORMALITY DIAGNOSTIC METHOD FOR INTERNAL COMBUSTION ENGINE

(71) Applicant: TOYOTA JIDOSHA KABUSHIKI KAISHA, Toyota-shi (JP)

(72) Inventor: Akihiro Katayama, Toyota (JP)

(73) Assignee: TOYOTA JIDOSHA KABUSHIKI KAISHA, Toyota-shi (JP)

(*) Notice: Subject to any disclaimer, the term of this patent is extended or adjusted under 35 U.S.C. 154(b) by 0 days.

(21) Appl. No.: 15/891,970

(22) Filed: Feb. 8, 2018

(65) Prior Publication Data
US 2018/0230922 A1     Aug. 16, 2018

(30) Foreign Application Priority Data
Feb. 13, 2017 (JP) ................. 2017-024267

(51) Int. Cl.
| | |
|---|---|
| G06F 19/00 | (2018.01) |
| F02D 41/14 | (2006.01) |
| F01N 3/10 | (2006.01) |
| F02D 35/00 | (2006.01) |
| F02D 41/34 | (2006.01) |
| F02D 41/00 | (2006.01) |

(52) U.S. Cl.
CPC ......... *F02D 41/1441* (2013.01); *F01N 3/101* (2013.01); *F02D 35/0092* (2013.01); *F02D 41/1495* (2013.01); *F02D 41/34* (2013.01); *F02D 41/0002* (2013.01); *F02D 2041/0017* (2013.01)

(58) Field of Classification Search
CPC ...... F02D 19/0623; F02D 41/22; F02D 19/025
USPC .............. 701/103–105, 107, 114; 73/114.38, 73/114.43, 114.75; 123/479, 69; 60/277, 60/284, 285
See application file for complete search history.

(56) References Cited

U.S. PATENT DOCUMENTS

| | | | | |
|---|---|---|---|---|
| 5,832,721 | A * | 11/1998 | Cullen ............... | B01D 53/9495 60/274 |
| 7,707,821 | B1 * | 5/2010 | Legare .................... | F01N 3/101 60/277 |
| 2007/0144145 | A1 * | 6/2007 | Takatsuto ............ | F02D 41/0255 60/277 |

(Continued)

FOREIGN PATENT DOCUMENTS

JP    2012-57492    3/2012

*Primary Examiner* — John Kwon
(74) *Attorney, Agent, or Firm* — Oblon, McClelland, Maier & Neustadt, L.L.P.

(57) ABSTRACT

An abnormality diagnostic device for an engine is provided. The abnormality diagnostic device includes an ECU that is configured to execute a temperature rise process so as to raise a temperature of a catalyst. The ECU is configured to determine whether the engine is in an abnormal state. The ECU is configured to store the following values (i) to (iv) in the abnormal state: (i) a speed of the engine, (ii) a load of the engine, (iii) a coolant temperature, (iv) an execution state indicative of whether the temperature rise process is executed. The ECU is configured to determine whether the engine has recovered from the abnormal state to a normal state based on a current speed of the engine, a current load of the engine, a current coolant temperature, and a current execution state of the temperature rise process.

4 Claims, 6 Drawing Sheets

(56) References Cited

U.S. PATENT DOCUMENTS

2013/0158841 A1\* 6/2013 Ito ...................... F02D 41/0085
                                                    701/104
2016/0208668 A1\* 7/2016 Matsumoto ........... F01N 3/2066

\* cited by examiner

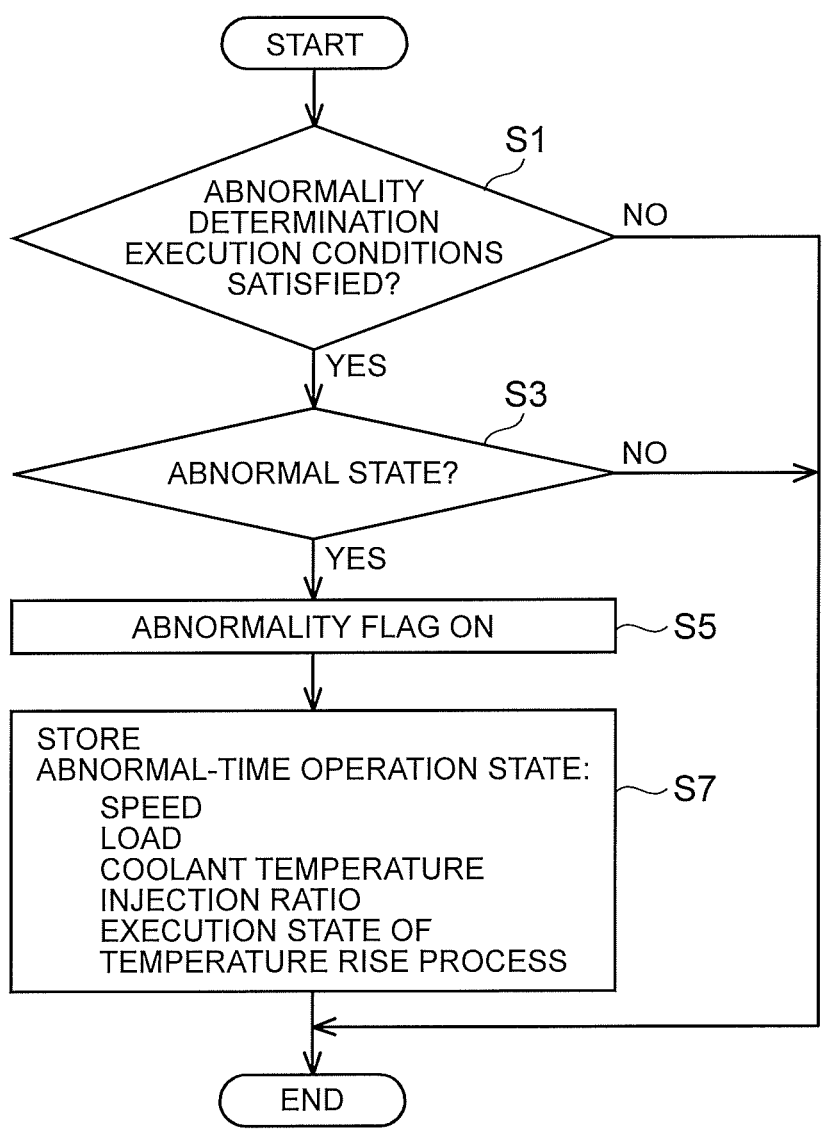

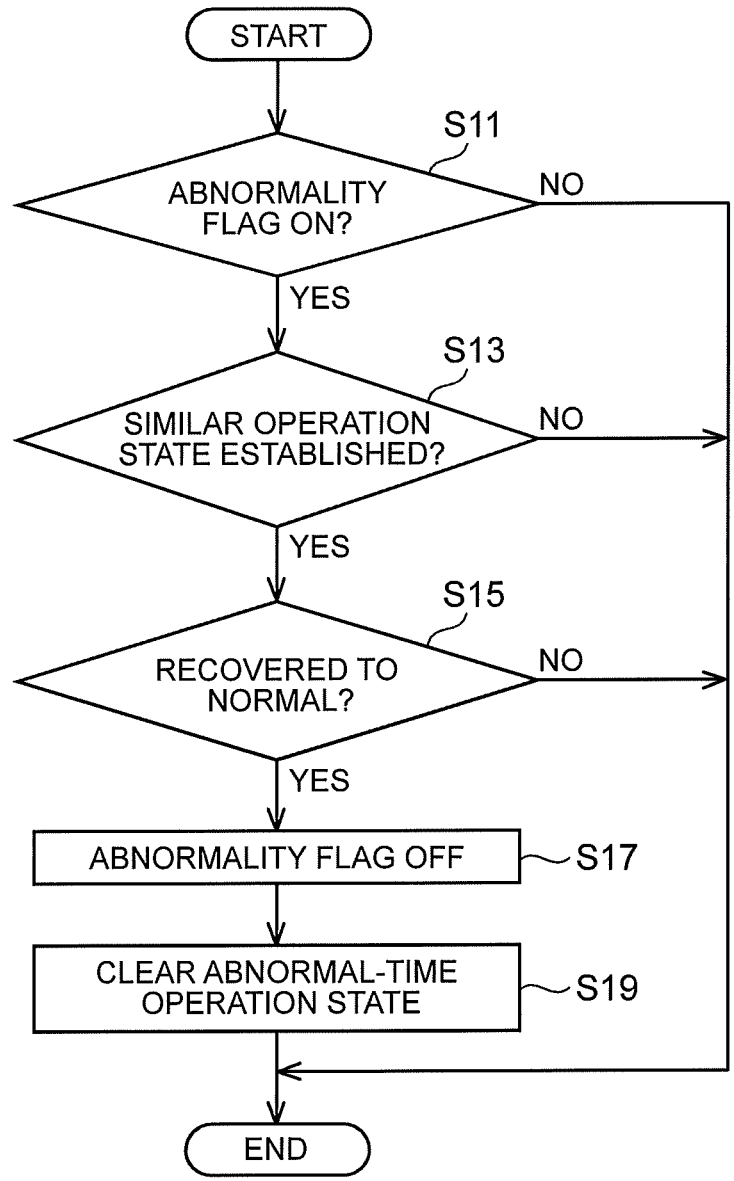

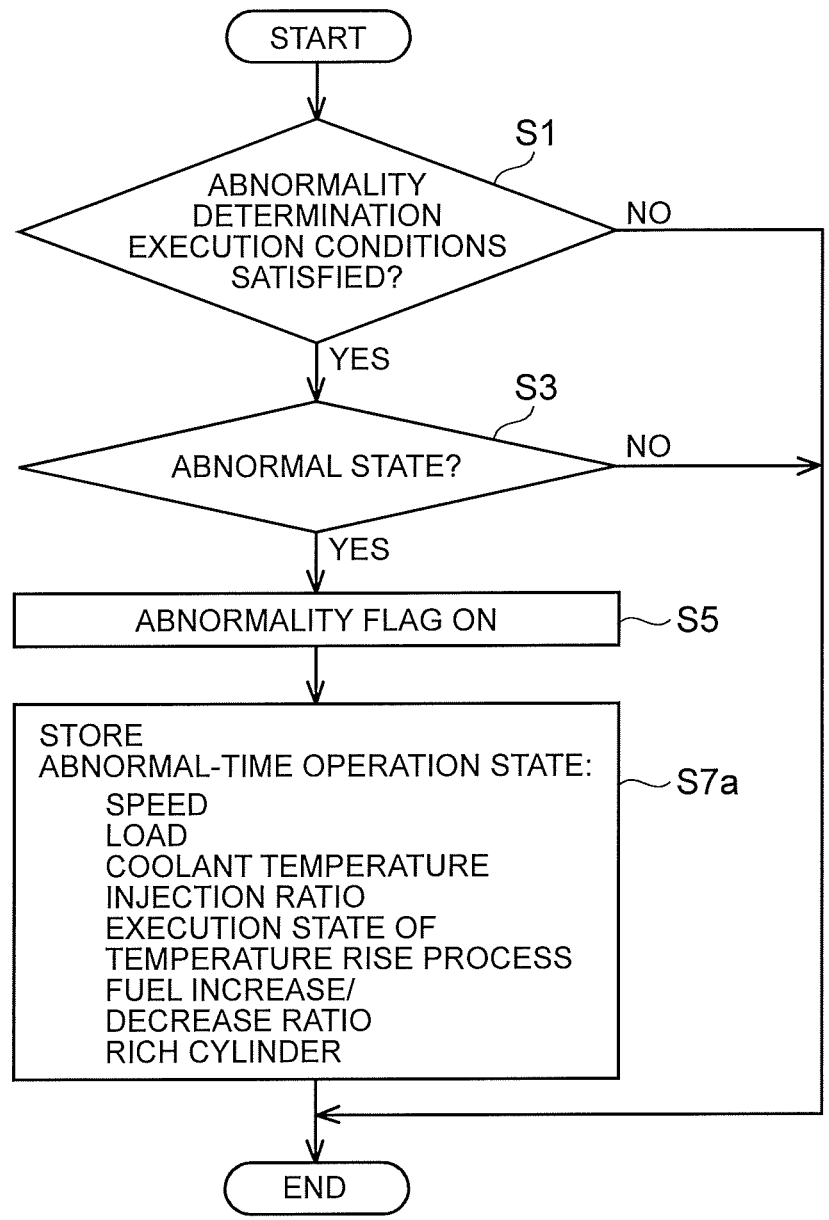

ABNORMALITY DIAGNOSTIC DEVICE FOR INTERNAL COMBUSTION ENGINE AND ABNORMALITY DIAGNOSTIC METHOD FOR INTERNAL COMBUSTION ENGINE

INCORPORATION BY REFERENCE

The disclosure of Japanese Patent Application No. 2017-024267 filed on Feb. 13, 2017 including the specification, drawings and abstract is incorporated herein by reference in its entirety.

BACKGROUND

1. Technical Field

The disclosure relates to an abnormality diagnostic device for an internal combustion engine and an abnormality diagnostic method for an internal combustion engine.

2. Description of Related Art

As a temperature rise process to raise a temperature of a catalyst that purifies exhaust gas of an internal combustion engine, a technique of controlling an air-fuel ratio of at least one of a plurality of cylinders in the internal combustion engine to a rich air-fuel ratio and controlling an air-fuel ratio of the other cylinder(s) to a lean air-fuel ratio is disclosed in Japanese Patent Application Publication No. 2012-057492 (JP 2012-057492 A).

SUMMARY

An abnormality diagnostic device has been known. The abnormality diagnostic device determines whether the internal combustion engine as described above is in an abnormal state where misfire occurs. If determining that the internal combustion engine is in the abnormal state, the abnormality diagnostic device determines whether the internal combustion engine has recovered from the abnormal state to a normal state thereafter. More specifically, after the internal combustion engine is determined to be in the abnormal state, an operation state of the internal combustion engine that includes a speed, a load, and a coolant temperature becomes the same as or similar to the operation state of the internal combustion engine in the abnormal state. At this time, the abnormality diagnostic device determines whether the internal combustion engine has recovered to the normal state. Since the abnormality diagnostic device determines whether the internal combustion engine has recovered to the normal state in the same or similar operation state to the operation state at the time when determining that the internal combustion engine is in the abnormal state, just as described, the abnormality diagnostic device can appropriately determine whether the internal combustion engine has recovered to the normal state.

However, the following possibility occurs: the internal combustion engine is determined to be in the abnormal state during the above-described temperature rise process of the catalyst, and is determined to have recovered to the normal state during a stop of the temperature rise process thereafter. In this case, the abnormal state possibly continues during the temperature rise process. Meanwhile, the following possibility occurs: the internal combustion engine is determined to be in the abnormal state during the stop of the temperature rise process, and is determined to have recovered to the normal state during the temperature rise process thereafter. In this case, the abnormal state possibly continues during the stop of the temperature rise process. Just as described, accuracy of a recovery determination to the normal state is possibly degraded.

The present disclosure provides an abnormality diagnostic device for an internal combustion engine and an abnormality diagnostic method for an internal combustion engine capable of suppressing degradation of accuracy of a recovery determination to a normal state.

A first aspect of the disclosure is an abnormality diagnostic device for an internal combustion engine. The internal combustion engine includes a plurality of cylinders. The abnormality diagnostic device includes an electronic control unit. The electronic control unit is configured to execute a temperature rise process so as to raise a temperature of a catalyst that purifies exhaust gas from the cylinders. The temperature rise process is a process to control an air-fuel ratio of at least one cylinder of the plurality of cylinders to a rich air-fuel ratio that is lower than a stoichiometric air-fuel ratio, and to control the air-fuel ratio of each of the other cylinders to a lean air-fuel ratio that is higher than the stoichiometric air-fuel ratio. The electronic control unit is configured to determine whether the internal combustion engine is in an abnormal state in which misfire occurs in at least one cylinder of the plurality of cylinders. The electronic control unit is configured to store the following values (i) to (iv) in the abnormal state when the electronic control unit determines that the internal combustion engine is in the abnormal state: (i) a speed of the internal combustion engine; (ii) a load of the internal combustion engine; (iii) a coolant temperature of the internal combustion engine; and (iv) an execution state indicative of whether the temperature rise process is executed. The electronic control unit is configured to determine whether the internal combustion engine has recovered from the abnormal state to a normal state when the electronic control unit determines that a current speed of the internal combustion engine, a current load of the internal combustion engine, and a current coolant temperature of the internal combustion engine have the same values as or fall within predetermined specified ranges of the stored speed of the internal combustion engine, the stored load of the internal combustion engine, and the stored coolant temperature of the internal combustion engine, and that a current execution state of the temperature rise process matches the stored execution state of the temperature rise process.

In the case where the speed, the load, and the like of the internal combustion engine are the same as or fall within the predetermined specified ranges of those in the abnormal state and the execution state of the temperature rise process matches the stored execution state of the temperature rise process, it is determined whether the internal combustion engine has recovered to the normal state. Therefore, degradation of accuracy of a recovery determination to the normal state is suppressed.

In the abnormality diagnostic device, the electronic control unit may be configured to store a parameter value that correlates with a difference between the rich air-fuel ratio and the lean air-fuel ratio controlled by the temperature rise process when the electronic control unit determines that the internal combustion engine is in the abnormal state during the temperature rise process. The electronic control unit may be configured to determine whether the parameter value that is controlled by the temperature rise process is the same as or falls within a predetermined specified range of the stored parameter value.

In the abnormality diagnostic device, the electronic control unit may be configured to store information indicative of the cylinder that is controlled at one of the rich air-fuel ratio and the lean air-fuel ratio by the temperature rise process when the electronic control unit determines that the internal combustion engine is in the abnormal state during the temperature rise process. The electronic control unit may be configured to determine whether the current cylinder that is controlled at one of the rich air-fuel ratio and the lean air-fuel ratio by the temperature rise process matches the cylinder indicated by the stored information.

A second aspect of the disclosure is an abnormality diagnostic method for an internal combustion engine. The internal combustion engine includes a plurality of cylinders. The abnormality diagnostic method includes: executing, by an electronic control unit, a temperature rise process so as to raise a temperature of a catalyst that purifies exhaust gas from the cylinders; determining, by the electronic control unit, whether the internal combustion engine is in an abnormal state in which misfire occurs in at least one cylinder of the plurality of cylinders; storing, in the electronic control unit, the following values (i) to (iv) in the abnormal state when the electronic control unit determines that the internal combustion engine is in the abnormal state, (i) a speed of the internal combustion engine, (ii) a load of the internal combustion engine, (iii) a coolant temperature of the internal combustion engine, and (iv) an execution state indicative of whether the temperature rise process is executed; and determining, by the electronic control unit, whether the internal combustion engine has recovered from the abnormal state to a normal state when the electronic control unit determines that a current speed of the internal combustion engine, a current load of the internal combustion engine, and a current coolant temperature of the internal combustion engine have the same values as or fall within predetermined specified ranges of the stored speed of the internal combustion engine, the stored load of the internal combustion engine, and the stored coolant temperature of the internal combustion engine, and that a current execution state of the temperature rise process matches the stored execution state of the temperature rise process. The temperature rise process is a process to control an air-fuel ratio of at least one cylinder of the plurality of cylinders to a rich air-fuel ratio that is lower than a stoichiometric air-fuel ratio, and to control the air-fuel ratio of each of the other cylinders to a lean air-fuel ratio that is higher than the stoichiometric air-fuel ratio.

The disclosure can provide the abnormality diagnostic device for the internal combustion engine capable of suppressing the degradation of the accuracy of the recovery determination to the normal state.

BRIEF DESCRIPTION OF THE DRAWINGS

Features, advantages, and technical and industrial significance of exemplary embodiments will be described below with reference to the accompanying drawings, in which like numerals denote like elements, and wherein:

FIG. 2 is a flowchart of an example of abnormality determination control;

FIG. 3 is a flowchart of an example of recovery determination control;

FIG. 5 is a flowchart of an example of the abnormality determination control in a modified example.

DETAILED DESCRIPTION OF EMBODIMENTS

Figure 1:
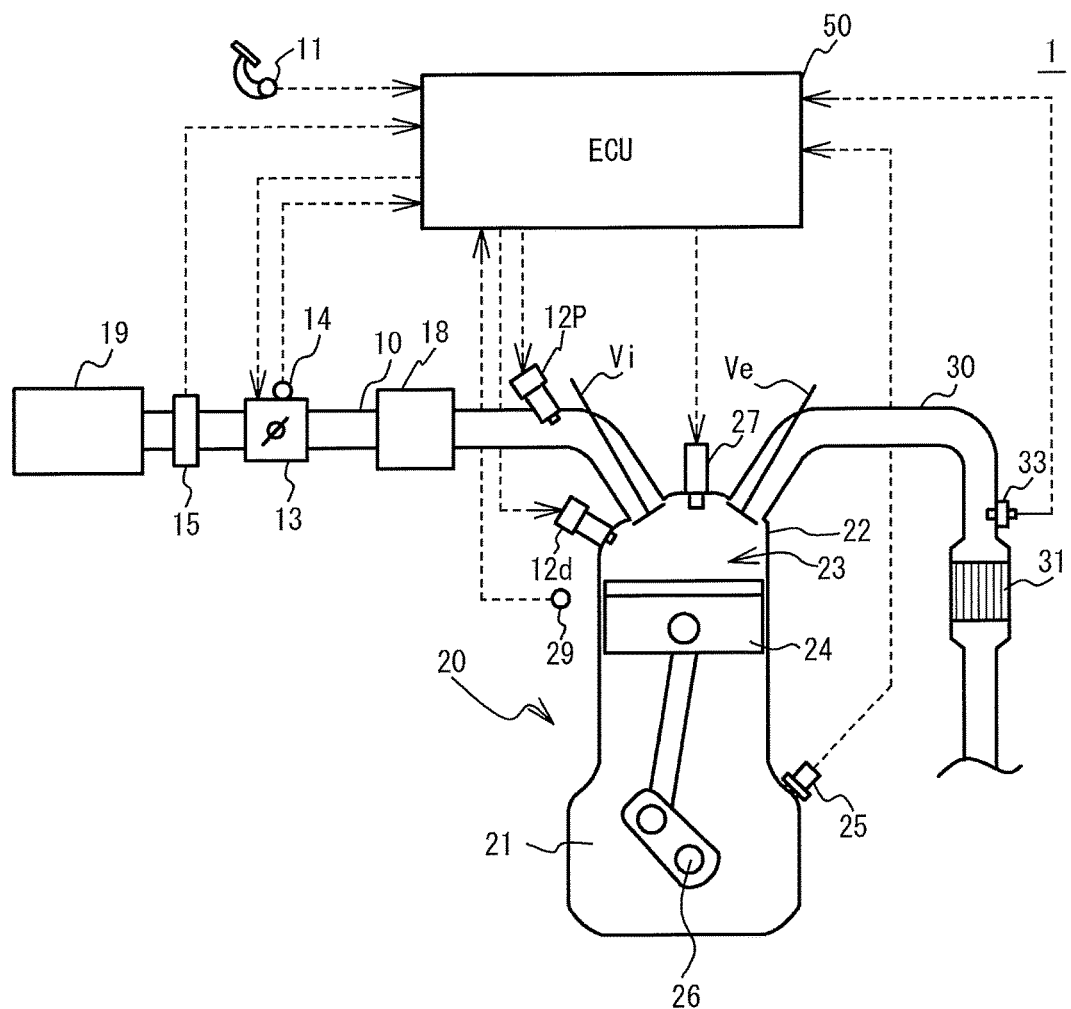
FIG. 1 is a schematic configuration view of an engine system.

FIG. 1 is a schematic configuration view of an engine system 1. An engine 20 burns air-fuel mixture in a combustion chamber 23 so as to reciprocate a piston 24. The combustion chamber 23 is provided in a cylinder head 22, and the cylinder head 22 is placed on a cylinder block 21 that accommodates the piston 24. Reciprocating motion of the piston 24 is converted to rotary motion of a crankshaft 26. The engine 20 is an in-line four-cylinder engine. However, the engine 20 is not limited thereto as long as the engine 20 has a plurality of cylinders.

In the cylinder head 22 of the engine 20, an intake valve Vi that opens/closes an intake port and an exhaust valve Ve that opens/closes an exhaust port are provided per cylinder. In addition, on the top of the cylinder head 22, an ignition plug 27 used to ignite the air-fuel mixture in the combustion chamber 23 is attached per cylinder.

The intake port of each of the cylinders is connected to a surge tank 18 via a branch pipe provided per cylinder. An intake pipe 10 is connected to an upstream side of the surge tank 18, and an air cleaner 19 is provided at an upstream end of the intake pipe 10. The intake pipe 10 is sequentially provided with an airflow meter 15 used to detect an intake air amount and an electronically-controlled throttle valve 13 from an upstream side.

In the intake port of each of the cylinders, a port injection valve 12$p$ is installed to inject fuel into the intake port. An in-cylinder injection valve 12$d$ that injects the fuel into the cylinder is also installed in each of the cylinders. The fuel that is injected by each of these injection valves is mixed with intake air to make the air-fuel mixture. During opening of the intake valve Vi, this air-fuel mixture is suctioned to the combustion chamber 23, compressed by the piston 24, ignited by the ignition plug 27, and burned.

Meanwhile, the exhaust port of each of the cylinders is connected to an exhaust pipe 30 via a branch pipe provided per cylinder. A three-way catalyst 31 is provided in the exhaust pipe 30. The three-way catalyst 31 has oxygen storage capacity and removes NOx, HC, and CO. The three-way catalyst 31 has one or more catalytic layers on a substrate, particularly, a honeycomb substrate including cordierite. The catalytic layer includes: a catalyst carrier such as alumina ($Al_2O_3$); and catalytic metal such as platinum (Pt), palladium (Pd), or rhodium (Rh) carried on the catalyst carrier. The three-way catalyst 31 is an example of a catalyst that purifies exhaust gas discharged from the plurality of cylinders provided in the engine 20, and may be an oxidation catalyst or a gasoline particulate filter coated with the oxidation catalyst.

An air-fuel ratio sensor 33 used to detect an air-fuel ratio of the exhaust gas is installed on an upstream side of the three-way catalyst 31. The air-fuel ratio sensor 33 is a so-called wide-range air-fuel ratio sensor, can successively detect the air-fuel ratio in a relatively wide range, and outputs a signal having a value that is proportional to the air-fuel ratio.

The engine system 1 includes an electronic control unit (ECU) 50. The ECU 50 includes a central processing unit (CPU), random access memory (RAM), read only memory (ROM), a storage device, and the like. The ECU 50 executes programs stored in the ROM and the storage device so as to control the engine 20. The ECU 50 is an abnormality diagnostic device that diagnoses an abnormality of the engine 20, and executes abnormality determination control and recovery determination control, which will be described below. These types of the control are realized by the CPU, the ROM, and the RAM. Specific contents of the control will be described below in detail.

The ignition plug 27, the throttle valve 13, the port injection valve 12$p$, the in-cylinder injection valve 12$d$, which are described above, and the like are electrically connected to the ECU 50. In addition, an accelerator operation amount sensor 11 that detects an accelerator operation amount, a throttle opening degree sensor 14 that detects an opening degree of the throttle valve 13, the airflow meter 15 that detects the intake air amount, the air-fuel ratio sensor 33, a crank angle sensor 25 that detects a crank angle of the crankshaft 26, a coolant temperature sensor 29 that detects a coolant temperature of the engine 20, and the other various sensors are electrically connected to the ECU 50 via an unillustrated A/D converter and the like. In order to obtain desired output of the engine 20, on the basis of detection values of the various sensors and the like, the ECU 50 controls the ignition plug 27, the throttle valve 13, the port injection valve 12$p$, the in-cylinder injection valve 12$d$, and the like for ignition timing, a fuel injection amount, a fuel injection ratio, fuel injection timing, the throttle opening degree, and the like.

Next, setting of a target air-fuel ratio by the ECU 50 will be described. During a stop of a temperature rise process, which will be described below, the target air-fuel ratio is set in accordance with an operation state of the engine 20. For example, the target air-fuel ratio is set to a stoichiometric air-fuel ratio in a low-speed, low-load region of the operation state of the engine 20. The target air-fuel ratio is set on a rich mixture side of the stoichiometric air-fuel ratio in a high-speed, high-load region of the operation state of the engine 20. Once the target air-fuel ratio is set, feedback control of the fuel injection amount for each of the cylinders is executed such that the air-fuel ratio detected by the air-fuel ratio sensor 33 matches the target air-fuel ratio.

The ECU 50 controls an injection ratio between the port injection valve 12$p$ and the in-cylinder injection valve 12$d$ such that the total fuel injection amount from the port injection valve 12$p$ and the in-cylinder injection valve 12$d$ corresponds to a desired injection amount with which the above-described target air-fuel ratio is realized. The injection ratio is a ratio of the injection amount from the in-cylinder injection valve 12$d$ to the total amount that includes the injection amount from the port injection valve 12$p$ and the injection amount from the in-cylinder injection valve 12$d$. For example, in the case where the operation state of the engine 20 is a low-load, low-speed state, the injection ratio is set at 0%, and the fuel is injected only from the port injection valve 12$p$. In the case where the operation state of the engine 20 is an intermediate-load, intermediate-speed state, the injection ratio is set to a ratio that is above 0% and below 100%, and the fuel is injected from both of the port injection valve 12$p$ and the in-cylinder injection valve 12$d$. In the case where the operation state of the engine 20 is a high-load, high-speed state, the injection ratio is set at 100%, and the fuel is injected only from the in-cylinder injection valve 12$d$.

The ECU 50 executes the temperature rise process to raise a temperature of the three-way catalyst 31 to a specified temperature range. In the temperature rise process, so-called dither control is executed. In the dither control, the air-fuel ratio of one of the cylinders is controlled to the rich air-fuel ratio that is lower than the stoichiometric air-fuel ratio, and the air-fuel ratios of the other three cylinders are each controlled to the lean air-fuel ratio that is higher than the stoichiometric air-fuel ratio. More specifically, in the control of the air-fuel ratios in the temperature rise process, the fuel injection amount of the one cylinder is corrected by increasing the fuel injection amount that corresponds to the above-described target air-fuel ratio by a specified rate, so as to control the air-fuel ratio of the one cylinder to the rich air-fuel ratio. The fuel injection amount of each of the other cylinders is corrected by decreasing the fuel injection amount that corresponds to the target air-fuel ratio by a specified rate, so as to control the air-fuel ratio of each of the other cylinders to the lean air-fuel ratio. For example, the fuel injection amount of the one cylinder is corrected by increasing the fuel injection amount that corresponds to the target air-fuel ratio by 15%, so as to control the air-fuel ratio of the one cylinder to the rich air-fuel ratio. The fuel injection amount of each of the other three cylinders is corrected by decreasing the fuel injection amount that corresponds to the target air-fuel ratio by 5%, so as to control the air-fuel ratio of each of the other three cylinders to the lean air-fuel ratio. When the temperature rise process is executed as described above, a surplus of the fuel is discharged from the cylinder that is set at the rich air-fuel ratio, adheres to the three-way catalyst 31, and is burned under a lean atmosphere that is created by the exhaust gas discharged from the cylinders set at the lean air-fuel ratio. In this way, the temperature of the three-way catalyst 31 is raised. The temperature rise process is an example of a process that is executed by a temperature rise process section of the ECU 50.

In the temperature rise process, an average of the air-fuel ratios of all the cylinders is set to be the stoichiometric air-fuel ratio. However, the average of the air-fuel ratios of all the cylinders does not always have to be the stoichiometric air-fuel ratio and only has to be the air-fuel ratio that falls within a specified range including the stoichiometric air-fuel ratio and at which the temperature of the three-way catalyst 31 can be raised to such a degree that purification capacity of the three-way catalyst 31 can be recovered. For example, the rich air-fuel ratio is set to have a value from 9 to 12, and the lean air-fuel ratio is set to have a value from 15 to 16. In addition, of the plurality of cylinders, at least one of the cylinders only has to be set at the rich air-fuel ratio, and the other cylinders have to be set at the lean air-fuel ratio.

The ECU 50 also determines whether the engine 20 is in an abnormal state where misfire occurs. When the misfire occurs in any one of the cylinders, a rotational speed of the crankshaft 26 is decreased at least in a combustion stroke of the cylinder. Accordingly, a rotation variation amount of the crankshaft 26 in the combustion stroke of the cylinder where the misfire occurs is larger than the rotation variation amount of the crankshaft 26 in the combustion stroke of each of the other cylinders where the misfire does not occur. Thus, it is determined whether the misfire is occurring on the basis of the rotation variation amount of the crankshaft 26 that is computed from the detection value of the crank angle sensor 25. More specifically, the number of occurrences of a situation where the rotation variation amount of the crankshaft 26 exceeds a specified amount is counted in a period until the crankshaft 26 rotates for the specified number of times. If a count value is equal to or larger than a threshold, it is determined that the engine 20 is in the abnormal state where the misfire occurs.

FIG. 2 is a flowchart of an example of the abnormality determination control that is executed by the ECU 50. This abnormality determination control is repeatedly executed at every specified period. First, it is determined whether abnormality determination execution conditions of making an abnormality determination are satisfied (step S1). Examples of the abnormality determination execution conditions are that a specified duration has elapsed since a start of the engine 20, that the fuel is not cut, and that the coolant temperature is equal to or higher than a specified temperature. If all of these conditions are satisfied, a positive determination is made in step S1. If any one of the conditions is not satisfied, a negative determination is made in step S1, and this control is terminated.

If the positive determination is made in step S1, it is determined whether the engine 20 is in the abnormal state where the misfire occurs in at least one of the cylinders (step S3). More specifically, as described above, the number of occurrences of the situation where the rotation variation amount of the crankshaft 26 exceeds the specified amount in the period is counted as the misfire count value until the crankshaft 26 rotates for the specified number of times. If the misfire count value is equal to or larger than the threshold, it is determined that the engine 20 is in the abnormal state. If the misfire count value is smaller than the threshold, it is determined that the engine 20 is not in the abnormal state. The process in step S3 is an example of a process executed by an abnormality determination section that determines whether the engine 20 is in the abnormal state where the misfire occurs in at least one of the cylinders. Here, when exceeding a specified value, the misfire count value is reset to zero. If a negative determination is made in step S3, this control is terminated.

If a positive determination is made in step S3, it is determined that the engine 20 is in the abnormal state, and an abnormality flag is turned ON (step S5). Once the abnormality flag is set to be ON, the ECU 50 turns on an unillustrated warning lamp.

Next, an abnormal-time operation state is stored in the memory of the ECU 50 (step S7). The abnormal-time operation state includes a speed of the engine 20, a load of the engine 20, the coolant temperature, the injection ratio, and an execution state of the temperature rise process at the time when it is determined in above step S3 that the engine 20 is in the abnormal state. The memory of the ECU 50 is an example of a storage section that stores the speed of the engine 20, the load of the engine 20, the coolant temperature of the engine 20, and the execution state of the temperature rise process in the abnormal state when the positive determination is made in step S3. The speed of the engine 20 is acquired on the basis of the detection value of the crank angle sensor 25. The load of the engine 20 is acquired on the basis of the detection value of the airflow meter 15. The coolant temperature is acquired on the basis of the detection value of the coolant temperature sensor 29. The injection ratio is acquired on the basis of a map that defines the injection ratio in accordance with the operation state of the engine 20. The execution state of the temperature rise process is a state where the temperature rise process is executed or is not executed.

The execution state of the temperature rise process is acquired on the basis of a temperature rise process execution flag. If the temperature rise process execution flag is ON, it means that the temperature rise process is executed. If the temperature rise process execution flag is OFF, it means that the temperature rise process is not executed. The acquisition of the execution state of the temperature rise process is not limited to the above method. The execution state of the temperature rise process may be acquired on the basis of a parameter value that varies in accordance with the execution state of the temperature rise process. For example, in the case where valve opening/closing timing is set at a maximum advance angle only during the temperature rise process, the execution state of the temperature rise process may be acquired by using an advance amount of the valve opening/closing timing as the above parameter value. Just as described, the execution state of the temperature rise process may be acquired on the basis of the parameter value that is directly or indirectly interlocked with the execution state of the temperature rise process.

As it has been described so far, if it is determined that the engine 20 is in the abnormal state where the misfire occurs, the abnormal-time operation state is stored, and this control is terminated.

FIG. 3 is a flowchart of an example of the recovery determination control that is executed by the ECU 50. This recovery determination control is repeatedly executed at every specified period. First, it is determined whether the abnormality flag is ON (step S11). If a negative determination is made, this control is terminated.

If a positive determination is made in step S11, it is determined whether a similar operation state where the current operation state of the engine 20 is the same as or similar to the abnormal-time operation state is established (step S13). More specifically, the similar operation state means that the current speed of the engine 20, the current load of the engine 20, the current coolant temperature, and the current injection ratio are the same as or fall within predetermined specified ranges of those in the abnormal-time operation state that are stored in step S7, and also means that the execution state of the temperature rise process matches the execution state of the temperature rise process that is stored in step S7. Falling within the specified ranges can mean that the load and the like substantially match those in the abnormal-time operation state, and also means falling within such a range that accuracy of a recovery determination to a normal state, which will be described below, is guaranteed. That the execution state of the temperature rise process matches the execution state of the temperature rise process stored in step S7 means that the temperature rise process is executed in the current operation state in the case where the temperature rise process is executed in the abnormal-time operation state and that the temperature rise process is not executed in the current operation state in the case where the temperature rise process is not executed in the abnormal-time operation state. The process in step S13 is an example of a process executed by a state determination section that determines whether the speed of the engine 20, the load of the engine 20, and the coolant temperature of the engine 20 are the same as or fall within the predetermined specified ranges of those that are stored in the memory of the ECU 50, and determines whether the execution state of the temperature rise process matches the execution state of the temperature rise process stored in the memory of the ECU 50. If a negative determination is made in step S13, this control is terminated.

If a positive determination is made in step S13, it is determined that the engine 20 has recovered from the abnormal state to the normal state (step S15). Similar to the method of making the abnormality determination, in a method of making the recovery determination, the number of occurrences of the situation where the rotation variation amount of the crankshaft 26 exceeds the specified amount is counted in the period until the crankshaft 26 rotates for the specified number of times, it is determined that the engine 20 has recovered to the normal state if the misfire count value is smaller than the threshold, and it is determined that the engine 20 has not recovered to the normal state if the misfire count value is equal to or larger than the threshold. The process in step S15 is an example of a process executed by a recovery determination section that determines whether the engine 20 has recovered from the abnormal state to the normal state when the positive determination is made in the process in step S13. Once any determination is made in step S15, the misfire count value is reset to zero again. If a negative determination is made in step S15, this control is terminated.

If a positive determination is made in step S15, the abnormality flag is switched from ON to OFF (step S17), and the stored abnormal-time operation state is cleared (step S19). When the abnormality flag is set from ON to OFF, the ECU 50 turns off the unillustrated warning lamp.

As it has been described so far, the recovery determination is made in the similar operation state where the execution state of the temperature rise process in the abnormal-time operation state matches the stored execution state of the temperature rise process. Accordingly, for example, in the case where it is determined that the engine 20 is in the abnormal state during a stop of the temperature rise process, it is determined whether the engine 20 has recovered to the normal state during the stop of the temperature rise process. Meanwhile, in the case where it is determined that the engine 20 is in the abnormal state during the temperature rise process, it is determined whether the engine 20 has recovered to the normal state during the temperature rise process.

The following possibly occurs when the recovery determination is made regardless of the execution state of the temperature rise process. For example, during the stop of the temperature rise process, the misfire occurs in a first cylinder of the four cylinders of the engine 20, and it is determined that the engine 20 is in the abnormal state. Thereafter, during the temperature rise process, the air-fuel ratio of the first cylinder is set to the rich air-fuel ratio, the misfire is eliminated, and it is determined that the engine 20 has recovered to the normal state. In this case, the misfire possibly continues in the first cylinder during the stop of the temperature rise process. The following also possibly occurs when the recovery determination is made regardless of the execution state of the temperature rise process. For example, during the temperature rise process, the air-fuel ratio of a second cylinder is set to the lean air-fuel ratio, the misfire occurs, and it is determined that the engine 20 is in the abnormal state. Thereafter, during the stop of the temperature rise process, the air-fuel ratio of the second cylinder is set to the stoichiometric air-fuel ratio, the misfire is eliminated, and it is determined that the engine 20 has recovered to the normal state. In this case, the misfire possibly continues in the second cylinder during the temperature rise process. Thus, the accuracy of the recovery determination to the normal state is possibly degraded, just as described.

Meanwhile, in this example, the recovery determination is made in the similar operation state where the execution state of the temperature rise process in the abnormal-time operation state matches the stored execution state of the temperature rise process. Thus, the degradation of the accuracy of the recovery determination as described above is suppressed.

Unlike the determination on whether the abnormality determination execution conditions are satisfied in step S1 of the abnormality determination control in FIG. 2, it is not determined whether recovery determination execution conditions are satisfied in the recovery determination control in FIG. 3. The recovery determination is only made in the same or similar operation state to the abnormal-time operation state, and the abnormal-time operation state is the state where the abnormality determination execution conditions are satisfied. Thus, the operation state unsuited for the recovery determination is inevitably excluded.

Figure 4A:
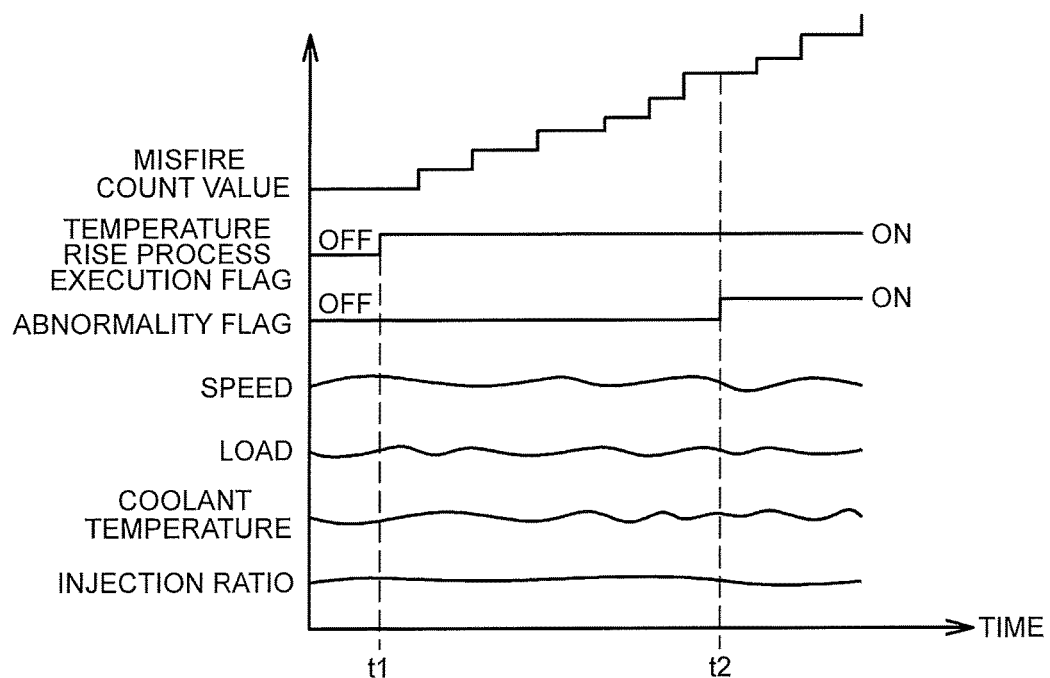
FIG. 4A is a timing chart during an abnormality determination.
Figure 4B:
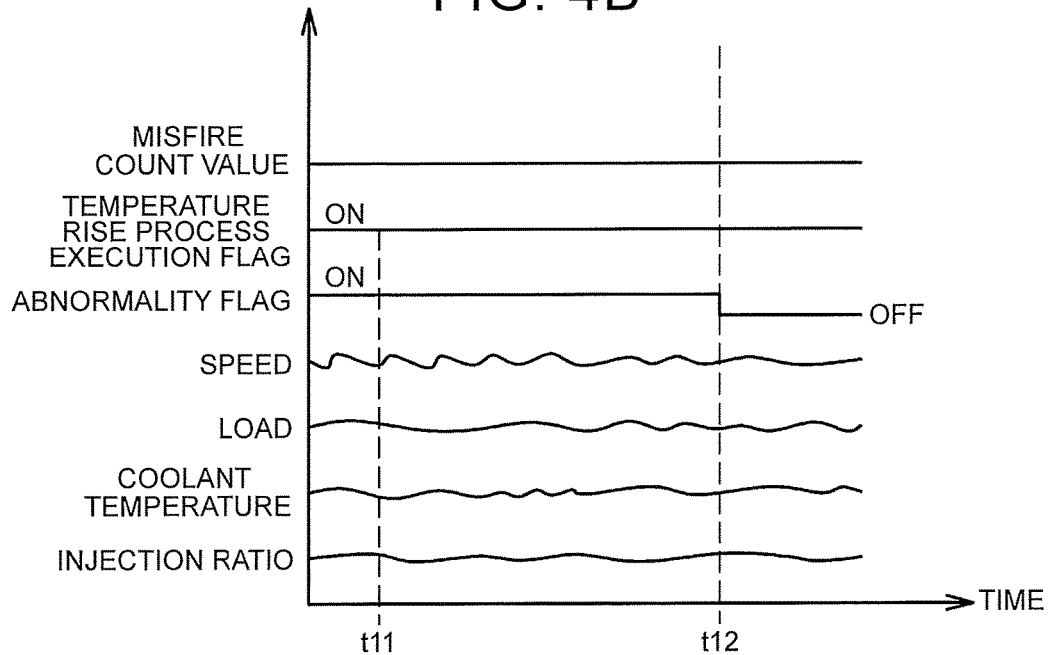
FIG. 4B is a timing chart during a recovery determination.

Next, the abnormality determination control and the recovery determination control that are described above will be described by using timing charts. FIG. 4A is a timing chart during the abnormality determination. FIG. 4B is a timing chart during the recovery determination. FIG. 4A and FIG. 4B are timing charts of a case where the abnormality determination is made during the temperature rise process and the recovery determination to the normal state is thereafter made during the temperature rise process. Each of FIG. 4A and FIG. 4B shows the misfire count value, the temperature rise process execution flag, the abnormality flag as well as the speed, the load, the coolant temperature, and the injection ratio of the engine 20.

As shown in FIG. 4A, after the temperature rise process execution flag is turned ON at time t1, the misfire count value is increased, and the misfire count value exceeds the threshold at time t2. In this case, it is determined that the engine 20 is in the abnormal state, and the abnormality flag is turned ON. The speed, the load, the coolant temperature, and the injection ratio of the engine 20 as well as the execution state of the temperature rise process at this time t2 are stored in the memory of the ECU 50.

Next, as shown in FIG. 4B, in an ON state of the temperature rise process execution flag, the similar operation state starts from time t11, and the misfire count value is not increased until time t12. In this case, it is determined that the engine 20 has recovered to the normal state, and the abnormality flag is turned OFF.

Next, the abnormality determination control and the recovery determination control in a modified example will be described. FIG. 5 is a flowchart of an example of the abnormality determination control in the modified example. In the abnormality determination control of the modified example, in step S7a, in addition to the speed of the engine 20 and the like described above, the fuel increase/decrease ratio that is controlled by the temperature rise process and a cylinder that is controlled at the rich air-fuel ratio (hereinafter referred to as a rich cylinder) are stored as the abnormal-time operation state in the memory of the ECU 50. In the case where the temperature rise process is not executed at a time point that it is determined that the engine 20 is in the abnormal state, the fuel increase/decrease ratio and the rich cylinder described above are not stored.

The fuel increase/decrease ratio is a total value of a fuel increase amount correction ratio and a fuel decrease amount correction ratio. The fuel increase amount correction ratio is applied to the fuel injection amount that corresponds to the target air-fuel ratio, so as to realize the rich air-fuel ratio as described above. The fuel decrease amount correction ratio is applied to the fuel injection amount that corresponds to the target air-fuel ratio, so as to realize the lean air-fuel ratio. For example, in the case where the fuel injection amount is increased by 15% for correction to control the air-fuel ratio to the rich air-fuel ratio and the fuel injection amount is decreased by 5% for correction to control the air-fuel ratio to the lean air-fuel ratio, the fuel increase/decrease ratio is 20%. It is indicated that, as this fuel increase/decrease ratio is increased, an air-fuel ratio difference that is a difference between the rich air-fuel ratio and the lean air-fuel ratio is increased. As the air-fuel ratio difference is increased, a temperature rise effect of the three-way catalyst 31 is enhanced. Thus, in this modified example, the fuel increase/decrease ratio is set to an intermediate ratio when the three-way catalyst 31 is heated during a cold start. The fuel increase/decrease ratio is set to a small ratio when a temperature of the three-way catalyst 31 after being heated is kept. The fuel increase/decrease ratio is set to a large ratio when the three-way catalyst 31 is recovered.

In the temperature rise process of this modified example, the same cylinder is not always controlled to be the rich cylinder or a lean cylinder. At specified timing, the rich cylinder is switched to be the cylinder that is controlled at the lean air-fuel ratio (hereinafter referred to as the lean cylinder), or the lean cylinder is switched to the rich cylinder. In this modified example, one of the four cylinders is controlled to be the rich cylinder, and the other cylinders are controlled to be the lean cylinders. Then, the memory of the ECU 50 stores which of the four cylinders is the rich cylinder.

Figure 6:
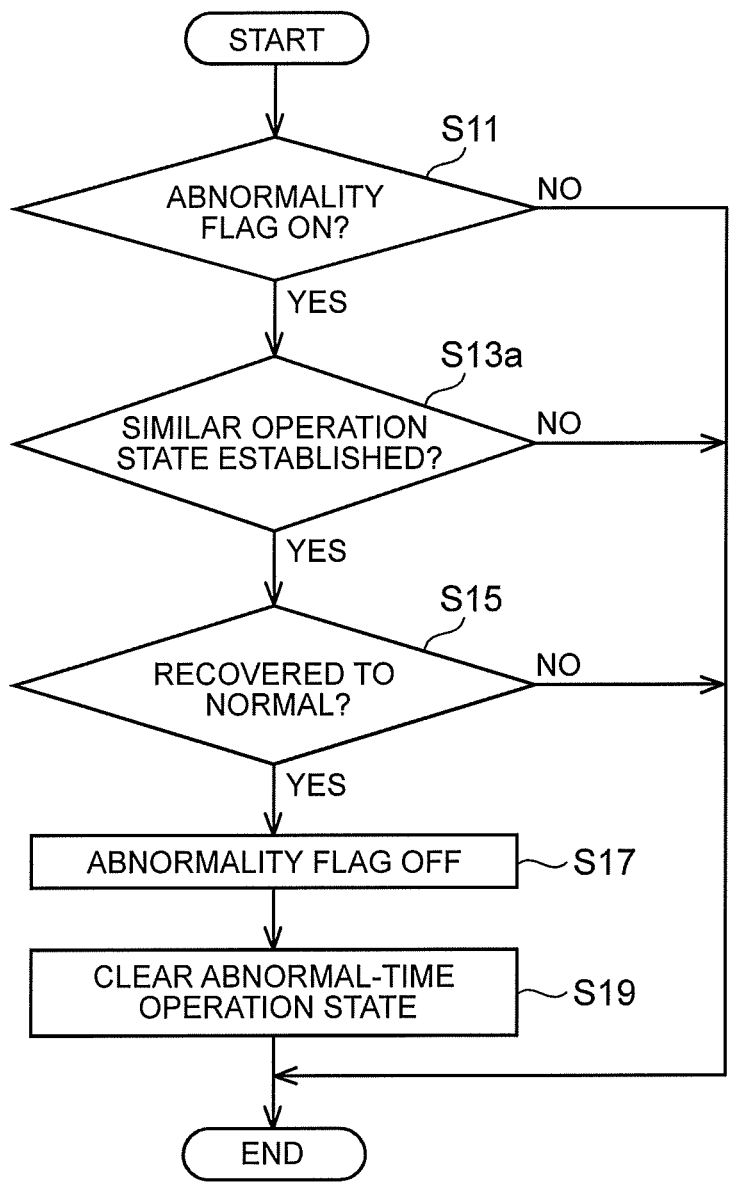
FIG. 6 is a flowchart of an example of the recovery determination control in the modified example.

FIG. 6 is a flowchart of an example of the recovery determination control in the modified example. The similar operation state, establishment of which is determined in step S13*a* of FIG. 6, means that the current speed of the engine 20, the current load of the engine 20, the current coolant temperature, the current injection ratio, and the current fuel increase/decrease ratio are the same as or fall within the predetermined specified ranges of those in the abnormal-time operation state that are stored in step S7*a*, and also means that the current execution state of the temperature rise process and the rich cylinder match those stored in step S7*a*.

A case where the fuel increase/decrease ratio in the temperature rise process is the same as or falls within the predetermined specified range and the rich cylinder matches that stored in step S7*a* corresponds to a state where conditions for the temperature rise process are substantially satisfied. When the recovery determination to the normal state is made in such a state, accuracy of the recovery determination is guaranteed.

The following possibility occurs when the recovery determination is made regardless of the fuel increase/decrease ratio in the temperature rise process. For example, during the temperature rise process in which the fuel increase/decrease ratio is set to be small, the misfire occurs in the rich cylinder whose fuel increase ratio is small, and it is determined that the engine 20 is in the abnormal state. Thereafter, the misfire in the same rich cylinder whose fuel increase/decrease ratio is set to be large is eliminated, and it is determined that the engine 20 has recovered to the normal state. In this case, in the temperature rise process in which the fuel increase ratio is set to be small, there is a possibility that the misfire continuously occurs in the rich cylinder.

In addition, the following problem possibly occurs when the recovery determination is made regardless of which cylinder is controlled to be the rich cylinder in the temperature rise process. For example, the following possibility occurs: after the second cylinder is controlled to be the lean cylinder in the temperature rise process, the misfire occurs, and it is determined that the engine 20 is in the abnormal state, the second cylinder is switched to be the rich cylinder, the misfire is eliminated, and it is determined that the engine 20 has recovered to the normal state. However, when the second cylinder is controlled to be the lean cylinder in the temperature rise process in the above case, there is a possibility that the misfire continuously occurs in the second cylinder. Thus, the accuracy of the recovery determination to the normal state is possibly degraded, just as described.

Meanwhile, in this modified example, the recovery determination is made in the similar operation state where the fuel increase/decrease ratio in the temperature rise process is the same as or falls within the specified range of the fuel increase/decrease ratio in the temperature rise process in the abnormal-time operation state and where the rich cylinder in the temperature rise process matches the rich cylinder in the temperature rise process in the abnormal-time operation state, in addition to the speed of the engine 20 and the like. Thus, the degradation of the accuracy of the recovery determination as described above is suppressed.

In the above modified example, in step S7*a*, the rich cylinder in the temperature rise process is stored in the memory of the ECU 50. However, instead of the rich cylinder, the lean cylinders may be stored in the memory of the ECU 50. In this case, it can be determined that the similar operation state is established if the lean cylinders in the temperature rise process match the lean cylinders that are stored in the memory. Alternatively, both of the rich cylinder and the lean cylinders in the temperature rise process may be stored in the memory. Thereafter, it may be determined that the similar operation state is established if the rich cylinder and the lean cylinders in the temperature rise process match the rich cylinder and the lean cylinders that are stored in the memory.

In the above modified example, since it is determined whether the similar operation state is established in consideration of both of the fuel increase/decrease ratio and the rich cylinder, there is a possibility that the number of opportunities to make the recovery determination is decreased. For this reason, it may be determined that the similar operation state is established, and the recovery determination may be made in the case where the fuel increase/decrease ratio in the temperature rise process is the same as or falls within the specified range of the fuel increase/decrease ratio in the temperature rise process in the abnormal-time operation state, regardless of which cylinder is the rich cylinder. Alternatively, it may be determined that the similar operation state is established, and the recovery determination may be made in the case where the rich cylinder in the temperature rise process is the same as the rich cylinder in the temperature rise process in the abnormal-time operation state, regardless of the fuel increase/decrease ratio. In this case, compared to the above-described modified example, an execution frequency of the recovery determination can be increased.

In the above example and modified example, in the temperature rise process, the rich air-fuel ratio and the lean air-fuel ratio in the temperature rise process are acquired by increasing or decreasing the fuel injection amount, with which the target air-fuel ratio is realized, for correction. However, the disclosure is not limited thereto. In the temperature rise process, the target air-fuel ratio of any one of the cylinders may directly be set to the rich air-fuel ratio, and the target air-fuel ratio of each of the other cylinders may directly be set to the lean air-fuel ratio. In this case, the difference between the rich air-fuel ratio and the lean air-fuel ratio, which is the target air-fuel ratio set in the temperature rise process, corresponds to the above-described parameter value.

In the above example and modified example, the engine 20 includes both of the port injection valve 12*p* and the in-cylinder injection valve 12*d*. However, the engine 20 is not limited to such an engine. The engine 20 may only include one of the port injection valve 12*p* and the in-cylinder injection valve 12*d*. In this case, without storing the injection ratio, it is determined whether the similar operation state that is the same as or similar to the abnormal-time operation state is established.

The example of the disclosure has been described in detail so far. However, the disclosure is not limited to such a particular example, and various modifications and changes can be made to the disclosure within the scope of the gist of the disclosure described in the claims.

What is claimed is:

1. An abnormality diagnostic device for an internal combustion engine, the internal combustion engine including a plurality of cylinders, the abnormality diagnostic device comprising:
    an electronic control unit configured to:
        execute a temperature rise process so as to raise a temperature of a catalyst that purifies exhaust gas from the cylinders, the temperature rise process being a process to control an air-fuel ratio of at least one cylinder of the plurality of cylinders to a rich air-fuel ratio that is lower than a stoichiometric air-fuel ratio, and to control the air-fuel ratio of each of the other cylinders to a lean air-fuel ratio that is higher than the stoichiometric air-fuel ratio;
        determine whether the internal combustion engine is in an abnormal state in which misfire occurs in at least one cylinder of the plurality of cylinders;
        store the following values (i) to (iv) in the abnormal state when the electronic control unit determines that the internal combustion engine is in the abnormal state,
            (i) a speed of the internal combustion engine,
            (ii) a load of the internal combustion engine,
            (iii) a coolant temperature of the internal combustion engine, and
            (iv) an execution state indicative of whether the temperature rise process is executed; and
        determine whether the internal combustion engine has recovered from the abnormal state to a normal state when the electronic control unit determines that a current speed of the internal combustion engine, a current load of the internal combustion engine, and a current coolant temperature of the internal combustion engine have the same values as or fall within predetermined specified ranges of the stored speed of the internal combustion engine, the stored load of the internal combustion engine, and the stored coolant temperature of the internal combustion engine, and that a current execution state of the temperature rise process matches the stored execution state of the temperature rise process.

2. The abnormality diagnostic device according to claim 1, wherein
    the electronic control unit is configured to store a parameter value that correlates with a difference between the rich air-fuel ratio and the lean air-fuel ratio controlled by the temperature rise process when the electronic control unit determines that the internal combustion engine is in the abnormal state during the temperature rise process, and
    the electronic control unit is configured to determine whether a current parameter value that is controlled by the temperature rise process is the same as or falls within a predetermined specified range of the stored parameter value.

3. The abnormality diagnostic device according to claim 1, wherein
    the electronic control unit is configured to store information indicative of the cylinder that is controlled at one of the rich air-fuel ratio and the lean air-fuel ratio by the temperature rise process when the electronic control unit determines that the internal combustion engine is in the abnormal state during the temperature rise process, and
    the electronic control unit is configured to determine whether the current cylinder that is controlled at one of the rich air-fuel ratio and the lean air-fuel ratio by the temperature rise process matches the cylinder indicated by the stored information.

4. An abnormality diagnostic method for an internal combustion engine, the internal combustion engine including a plurality of cylinders, the abnormality diagnostic method comprising:
    executing, by an electronic control unit, a temperature rise process so as to raise a temperature of a catalyst that purifies exhaust gas from the cylinders, the temperature rise process being a process to control an air-fuel ratio of at least one cylinder of the plurality of cylinders to a rich air-fuel ratio that is lower than a stoichiometric air-fuel ratio, and to control the air-fuel ratio of each of the other cylinders to a lean air-fuel ratio that is higher than the stoichiometric air-fuel ratio;
    determining, by the electronic control unit, whether the internal combustion engine is in an abnormal state in which misfire occurs in at least one cylinder of the plurality of cylinders;
    storing, in the electronic control unit, the following values (i) to (iv) in the abnormal state when the electronic control unit determines that the internal combustion engine is in the abnormal state,
        (i) a speed of the internal combustion engine,
        (ii) a load of the internal combustion engine,
        (iii) a coolant temperature of the internal combustion engine, and
        (iv) an execution state indicative of whether the temperature rise process is executed; and
    determining, by the electronic control unit, whether the internal combustion engine has recovered from the abnormal state to a normal state when the electronic control unit determines that a current speed of the internal combustion engine, a current load of the internal combustion engine, and a current coolant temperature of the internal combustion engine have the same values as or fall within predetermined specified ranges of the stored speed of the internal combustion engine, the stored load of the internal combustion engine, and the stored coolant temperature of the internal combustion engine, and that a current execution state of the temperature rise process matches the stored execution state of the temperature rise process.

* * * * *